(12) United States Patent
Severance, Jr. et al.

(10) Patent No.: US 6,563,075 B1
(45) Date of Patent: May 13, 2003

(54) METHOD OF FORMING AN ELECTRODE

(75) Inventors: Wayne Stanley Severance, Jr., Darlington, SC (US); Valerian Nemchinsky, Florence, SC (US); Gregory William Diehl, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 10/027,678

(22) Filed: Dec. 20, 2001

(51) Int. Cl.[7] .............................................. B23K 10/00
(52) U.S. Cl. ........................... 219/121.46; 219/121.52; 219/75; 219/121.59; 313/231.31
(58) Field of Search ................... 219/121.59, 121.48, 219/121.52, 74, 75, 119, 121.37, 121.36, 121.46; 313/231.31, 231.41; 315/111.21

(56) References Cited

U.S. PATENT DOCUMENTS

| | | |
|---|---|---|
| 3,198,932 A | 8/1965 | Weatherly |
| 3,930,139 A | 12/1975 | Bykhovsky et al. |
| 4,056,644 A | 11/1977 | Howard et al. |
| 4,304,984 A | 12/1981 | Bolotnikov et al. |
| 4,749,594 A | 6/1988 | Malikowski et al. |
| 4,766,349 A | 8/1988 | Johansson et al. |
| 4,843,206 A | 6/1989 | Azuma et al. |
| 5,021,627 A | 6/1991 | Bersch et al. |
| 5,023,425 A | 6/1991 | Severance, Jr. |
| 5,097,111 A | 3/1992 | Severance, Jr. |
| 5,200,594 A | 4/1993 | Okada et al. |
| 5,628,924 A | 5/1997 | Yoshimitsu et al. |
| 5,676,864 A | 10/1997 | Walters |
| 5,767,478 A | 6/1998 | Walters |
| 5,776,556 A | 7/1998 | Lazarov et al. |
| 5,851,678 A | 12/1998 | Hasz et al. |
| 5,857,888 A | 1/1999 | Tada et al. |
| 5,908,567 A | 6/1999 | Sakuragi et al. |
| 6,020,572 A | 2/2000 | Marner et al. |
| 6,066,827 A | 5/2000 | Nemchinsky |
| 6,114,650 A | 9/2000 | Marner et al. |
| 6,423,922 B1 * | 7/2002 | Nemchinsky .......... 219/121.52 |
| 6,433,300 B1 * | 8/2002 | McBennett ............ 219/121.52 |

FOREIGN PATENT DOCUMENTS

JP  4-147772  5/1992

OTHER PUBLICATIONS

Cross–sectional view of an Electrode.
Osamu Taguchi, Yoshiaki Iijima; Reaction Diffusion in the silver–hafnium system, Journal of Alloys and Compounds 226 (1995) 185–189, Sendai, Japan.

* cited by examiner

*Primary Examiner*—Mark Paschall
(74) *Attorney, Agent, or Firm*—Alston & Bird LLP

(57) ABSTRACT

A method of fabricating an electrode is disclosed, wherein the electrode comprises a copper holder defining a cavity in a forward end. An emissive element and separator assembly is positioned in the cavity. An intermetallic compound is formed between the emissive element and the separator by heating a relatively non-emissive material until it melts and dipping the emissive element therein before cooling the assembly. As a result, the intermetallic compound is formed significantly faster than by conventional methods.

61 Claims, 8 Drawing Sheets

METHOD OF FORMING AN ELECTRODE

FIELD OF THE INVENTION

The present invention relates to plasma arc torches and, more particularly, to a method of forming an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of gas, and in some torch designs it is conventional to also envelop the gas and arc with a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element embedded therein which supports the arc. The element is composed of a material which has a relatively low work function, which is defined in the art as the potential step, measured in electron volts (ev), which permits thermionic emission from the surface of a metal at a given temperature. In view of its low work function, the element is thus capable of readily emitting electrons.when an electrical potential is applied thereto. Commonly used emissive materials include hafnium, zirconium, tungsten, and their alloys. Some electrodes include a relatively non-emissive separator, which is disposed about the emissive element and acts to prevent the arc from migrating from the emissive element to the copper holder.

A problem associated with torches of the type described above is the short service life of the electrode, particularly when the torch is used with an oxidizing gas, such as oxygen or air. More particularly, the gas tends to rapidly oxidize the copper of the electrode that surrounds the emissive element, and as the copper oxidizes, it more readily emits. As a result, a point is reached at which the oxidized copper surrounding the emissive element begins to support the arc, rather than the element. When this happens, the copper oxide and the supporting copper melt, resulting in early destruction and failure of the electrode.

Many conventional electrodes are assembled by pressing the emissive insert into the metallic holder, or by pressing the emissive insert into a relatively less- or non-emissive sleeve or separator that is then pressed into the metallic holder. The interfaces between the press-fit emissive element, separator, and holder are relatively well defined, and thereby negatively affect the thermal conductivity of the assembled electrode. Specifically, heat travelling through the electrode encounters the interfaces, which act as barriers to heat transfer and thus restrict the heat transfer ability of the electrode. In addition, the well defined interfaces act as stress concentrators that may attract the arc and accelerate the demise of the electrode.

In order to help "smooth" the interfaces between the emissive element, separator, and holder, the assignee of the present invention has developed a diffusion bonding technique described in a co-pending application with Ser. No. 09/773,847 ("the '847 application") entitled "Electrode Diffusion Bonding." In the co-pending '847 application, a post-assembly heating step is described that creates a diffusion bond between the separator and the metallic holder. The diffusion bond softens or smoothes the interface between the two materials, while increasing the bond strength therebetween. As a result, the electrode has a longer operational life.

Another method of forming an electrode is described in another co-pending application with Ser. No. 09/871,071 ("the '071 application") entitled "Electrode Interface Bonding." In the co-pending '071 application, an intermetallic compound is formed between the emissive element and the separator that provides an improved bond therebetween. The intermetallic bond is formed by heating the emissive element and separator to about 1700°–1800° F. for about 1 hour. A second post-fabrication heating step can also be performed in order to form a eutectic bond between the separator and the metallic holder.

While the post-assembly heating step of the co-pending '847 and '701 applications represent improvements in the state of the art, further improvements are desired. In particular, a study of the materials used in an electrode shows that many electrodes employ an emissive element comprising hafnium, zirconium, or the like; a separator comprising silver, gold, nickel, or the like; and a metallic holder comprising copper. While the post-assembly heating steps of the co-pending '847 and '701 applications improve the bonds between the emissive element and the separator, and between the separator and the holder, it is desirable to further improve the bond therebetween or provide an advantageous alternative.

SUMMARY OF THE INVENTION

The present invention was developed to improve upon conventional and recently discovered methods of making electrodes. It has been discovered that the deficiencies in the life and performance of electrodes for plasma torches can be improved by forming the electrode by inserting an emissive element in a molten or substantially flowable non-emissive material and then allowing them to cool to form an assembly that is used to form the electrode. Advantageously, the emissive element and non-emissive material form a strong bond therebetween relatively quickly, and in, some cases an intermetallic compound is formed between the emissive element and the non-emissive material or member, which in one embodiment acts as a separator between the emissive element and the metallic holder. As such, the electrode of the present invention performs better and can be manufactured faster than conventional electrode fabricating methods.

In particular, a method of fabricating an electrode according to the present invention includes heating a relatively non-emissive material or member until the material becomes substantially flowable. The heating step is preferably performed with a crucible, where the non-emissive material is heated in the crucible to at least around its melting point. The emissive element is positioned above the melted non-emissive material and the emissive element is allowed to drop or is advanced at least partially into the non-emissive material. Force can also be used to help advance or insert the emissive element into the non-emissive material. This position is then held for a predetermined time, such as about 1 minute, and the assembly is allowed to cool. In one embodiment, a vacuum or reduced pressure environment is created around the emissive element and the non-emissive material during the fabrication of the electrode. As a result, an intermetallic compound is formed between the emissive element and the non-emissive material, which provides a superior bond therebetween compared to diffusion bonds or interference fits.

According to one embodiment, the assembly formed by the emissive element and the non-emissive material is then positioned in a conventional metallic holder of the electrode. The positioning step may include press fitting, brazing, or welding the assembly into the holder. Alternatively, the assembly itself may be shaped to define the front of the electrode instead of including the metallic holder. Thus, the non-emissive member of the assembly can be shaped to define a substantial portion of the electrode. This is advantageous because the non-emissive member is preferably formed from a material that has greater thermal conductivity than conventional materials that form the metallic holder. For example, the non-emissive material used to replace the metallic holder is preferably formed from at least one of the materials from the group consisting of silver, gold, platinum, rhodium, iridium, palladium, nickel, monel, and alloys thereof, while metallic holders are typically formed from copper.

In yet another embodiment, the metallic holder is used a the "crucible" for the relatively non-emissive material wherein a blank of the non-emissive material is heated in a cavity defined by the metallic holder or blank until it becomes substantially flowable. The emissive element is then inserted or advanced into the non-emissive material, preferably during the heating step. The metallic holder is then shaped into a predetermined shape so that the electrode can be used in cutting and welding operations.

Advantageously, the intermetallic compound formed between the emissive element and the non-emissive material is formed faster than that described in the co-pending '701 application. More specifically, the intermetallic compound forming step according to the present invention can be performed on the order of about 1 minute, while the intermetallic compound forming step according to the '701 application occurs on the order of about 1 hour. Therefore, the electrode fabrication process of the present invention provides a significant time savings while still achieving an improved bond between the emissive element and the non-emissive member compared to conventional methods.

BRIEF DESCRIPTION OF THE DRAWINGS

Figure 1:
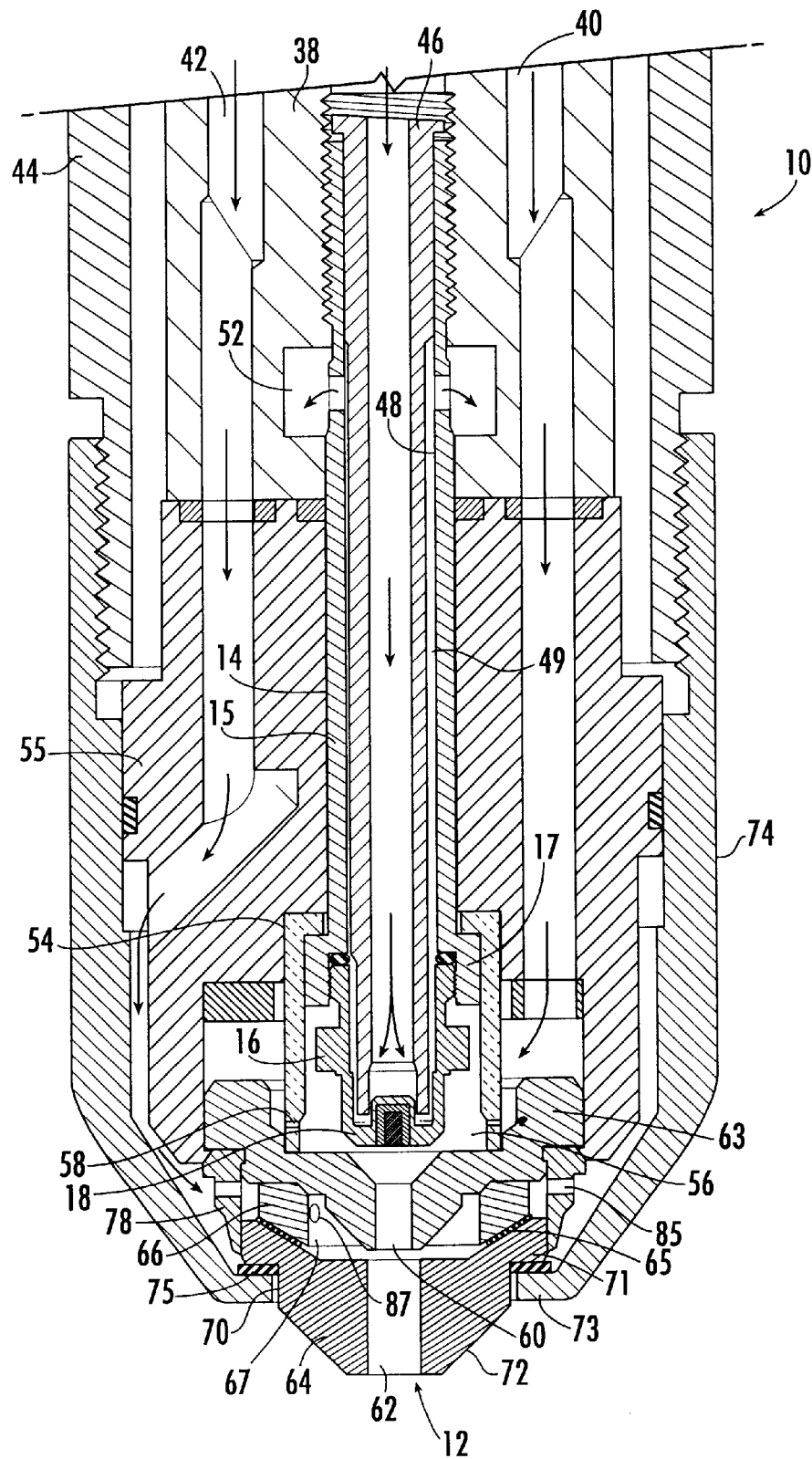
Figure 2:
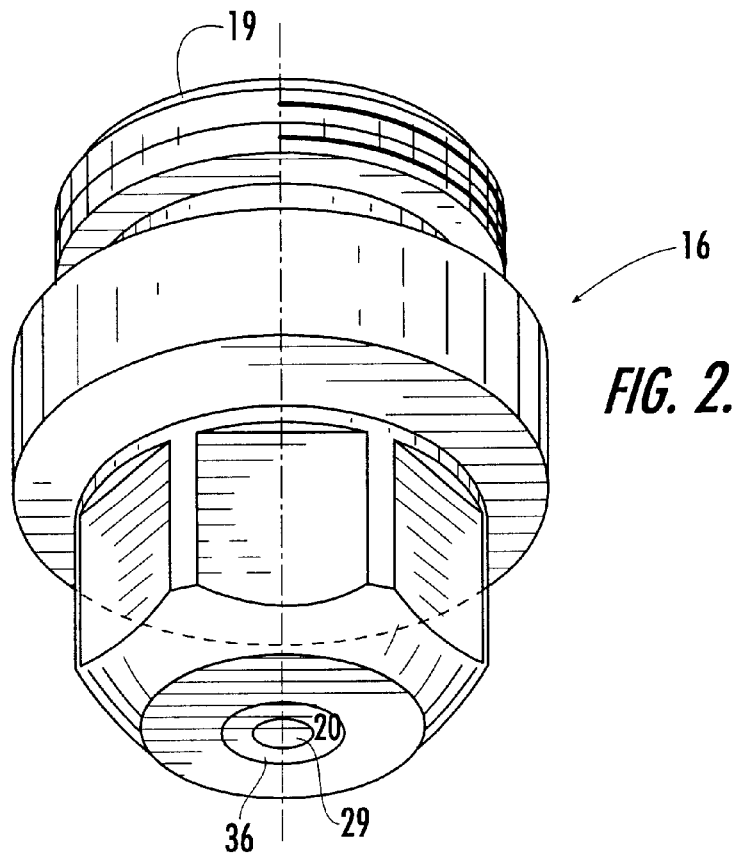
Figure 3:
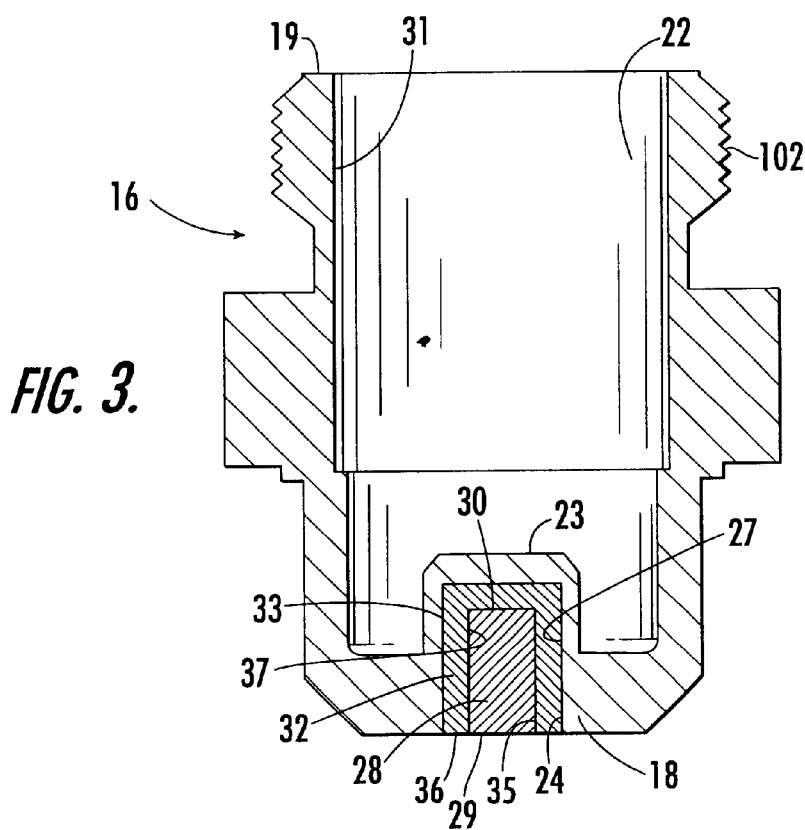
Figure 9:
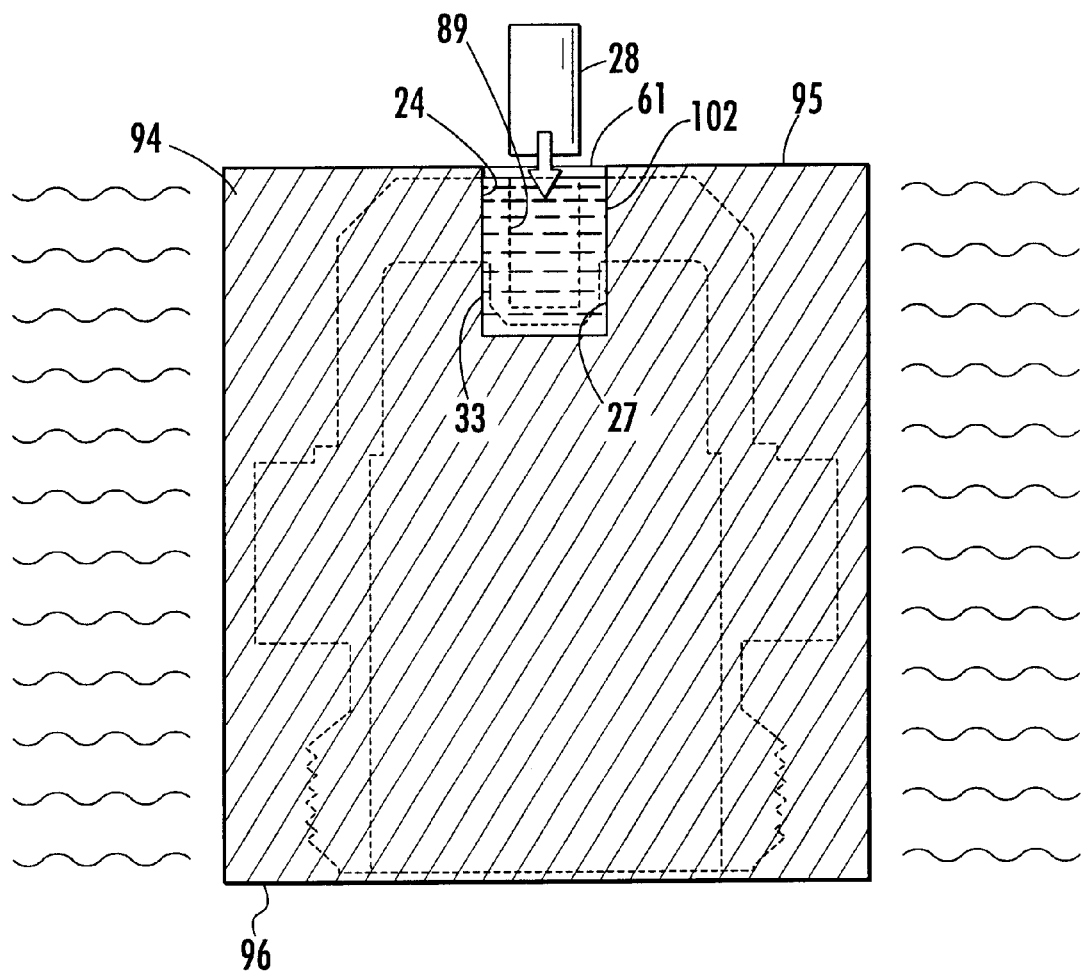
Figure 10:
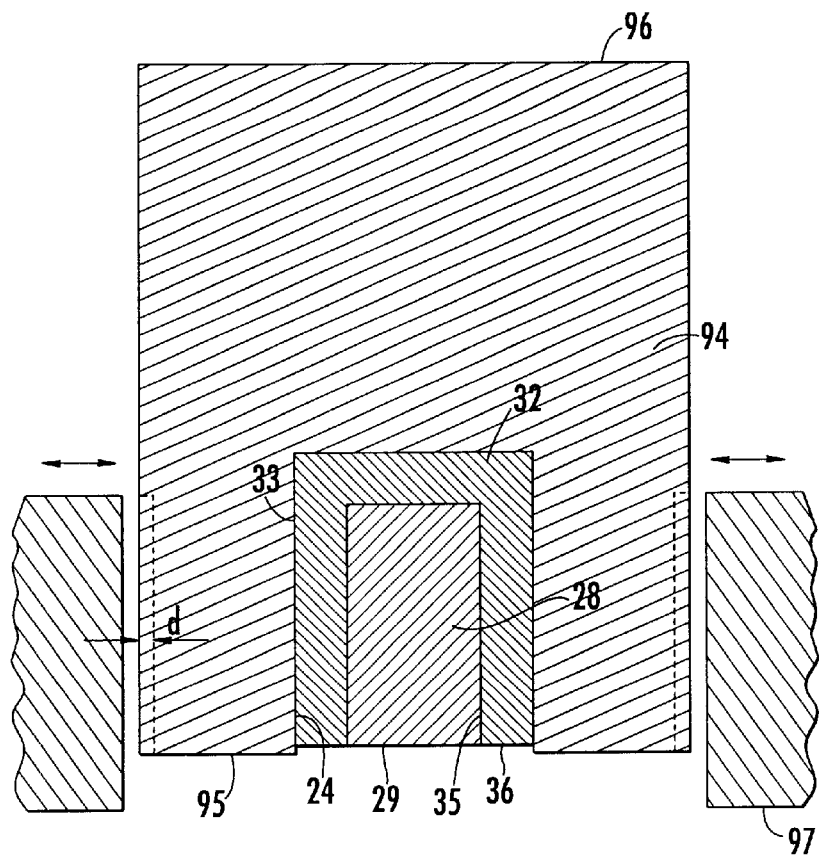
Figure 11:
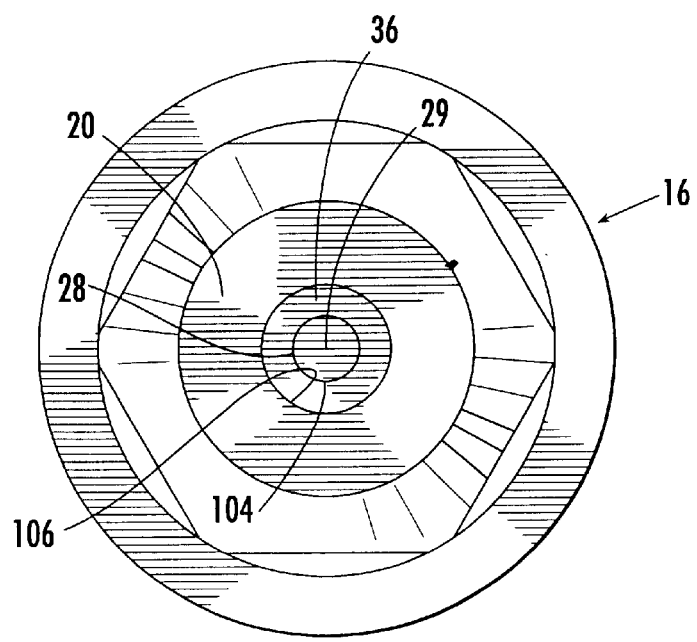

Having thus described the invention in general terms, reference will now be made to the accompanying drawings, which are not necessarily drawn to scale, and wherein:

FIG. 1 is a sectioned side elevational view of a plasma arc torch which embodies the features of the present invention;

FIG. 2 is an enlarged perspective view of an electrode in accordance with the present invention;

FIG. 3 is an enlarged sectional side view of an electrode in accordance with the present invention;

FIGS. 4A–6 illustrate schematic views of the steps of one method of fabricating an electrode in accordance with the present invention;

FIGS. 7A–8B illustrate schematic views of the steps of another method of fabricating an electrode in accordance with the present invention;

FIG. 9 illustrates a schematic view of yet another method of fabricating an electrode in accordance with the present invention;

FIG. 10 is a greatly enlarged cross-sectional view of an electrode showing a crimping operation according to one embodiment of the present invention; and FIG. 11 is an end elevational view of a finished electrode in accordance with the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIGS. 1–3, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and is aligned along the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20. The rear end of the holder 16 is externally threaded and is threadedly joined to the lower end portion 17 of the upper tubular member 15.

The holder 16 is open at the rear end 19 thereof such that the holder is of cup-shaped configuration and defines an internal cavity 22. The internal cavity 22 has a surface 31 that includes a cylindrical post 23 extending into the internal cavity along the longitudinal axis. A generally cylindrical cavity 24 is formed in the front face 20 of the end wall 18 and extends rearwardly along the longitudinal axis and into a portion of the holder 16. The cavity 24 includes inner side surface 27.

According to one embodiment, a relatively non-emissive member or separator 32 is positioned in the cavity 24 and is disposed coaxially along the longitudinal axis. The separator 32 has an outer peripheral wall 33 extending substantially the length of the cavity 24. In one embodiment (not shown), at least part of the outer peripheral wall 33 of the separator 32 is exposed to the internal cavity 22 defined by the holder 16. The peripheral wall 33 is illustrated as having a substantially constant outer diameter over the length of the separator, although it will be appreciated that other geometric configurations would be consistent with the scope of the invention, such as frustoconical. The separator 32 also defines an internal cavity 35 having a surface 37. The separator 32 also includes an outer end face 36 which is generally flush with the front face 20 of the holder 16.

An emissive element or insert 28 is positioned in the separator 32 and is disposed coaxially along the longitudinal axis. More specifically, the emissive element 28 and the separator 32 form an assembly wherein the emissive element is secured to the separator by a unique method discussed below. An intermetallic compound, which is effected by inserting or advancing the emissive element into a liquid or molten bath of non-emissive material that forms the separator, is interposed therebetween as discussed more fully below. The emissive element 28 has a circular outer end face 29 lying in the plane of the front face 20 of the holder 16 and the outer end face 36 of the separator 32. The emissive element 28 also includes a generally circular inner end face 30 which is disposed in the cavity 35 defined by the separator 32 and is opposite the outer end face 29. The inner end face 30, however, can have other shapes, such as pointed, polygonal, or spherical, in order to assist in securing the emissive element to the separator 32. In addition, the diameter of the emissive element 28 is about 30–80 percent of the outer diameter of the end face 36 of the separator 32, which has a radial thickness of at least about 0.25 mm (0.01 inch) at the outer end face 36 and along its entire length. As a specific example, the emissive element 28 typically has a diameter of about 0.08 inch and a length of about 0.25 inch, and the outer diameter of the separator 32 is about 0.25 inch.

The emissive element 28 is composed of a metallic material having a relatively low work function, such as in a range of about 2.7 to 4.2 ev, so as to be capable of readily emitting electrons upon an electrical potential being applied thereto. Suitable examples of such materials are hafnium, zirconium, tungsten, and mixtures thereof.

The separator 32 is composed of a metallic material having a work function that is greater than that of the material of the holder 16, according to values presented in Smithells Metal Reference Book, 6th Ed. More specifically, it is preferred that the separator 32 be composed of a metallic material having a work function of at least about 4.3 ev. In a preferred embodiment, the separator 32 comprises silver, although other metallic materials, such as gold, platinum, rhodium, iridium, palladium, nickel, monel, and alloys thereof, may also be used. The selected material for the separator 32 should have high thermal conductivity, high resistance to oxidation, high melting point, high work function, and low cost. Although it is difficult to maximize all of these properties in one material, silver is preferred due to its high thermal conductivity.

For example, in one particular embodiment of the present invention, the separator 32 is composed of a silver alloy material comprising silver alloyed with about 0.25 to 10 percent of an additional material selected from the group consisting of copper, aluminum, iron, lead, zinc, and alloys thereof. The additional material may be in elemental or oxide form, and thus the term "copper" as used herein is intended to refer to both the elemental form as well as the oxide form, and similarly for the terms "aluminum" and the like.

With reference again to FIG. 1, the electrode 14 is mounted in a plasma torch body 38, which includes gas and liquid passageways 40 and 42, respectively. The torch body 38 is surrounded by an outer insulated housing member 44. A tube 46 is suspended within the central bore 48 of the electrode 14 for circulating a liquid cooling medium, such as water, through the electrode 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 38 and to a drain hose (not shown). The passageway 42 directs injection water into the nozzle assembly 12 where it is converted into a swirling vortex for surrounding the plasma arc, as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14. The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 that defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

METHOD OF FABRICATION

Figure 4A:
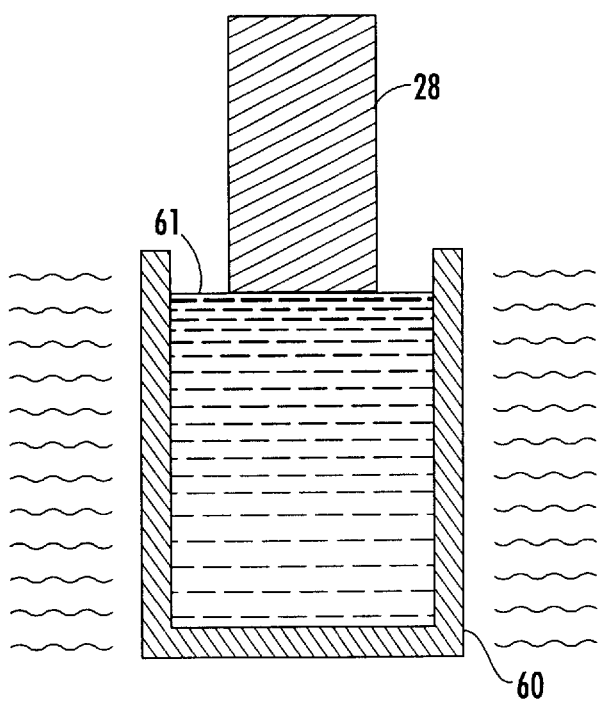

The invention also provides a simplified method for fabricating an electrode of the type described above. FIGS. 4A–6 illustrate one method of fabricating the electrode in accordance with the present invention. As shown in FIG. 4A, a blank 61 of relatively non-emissive material is disposed in a crucible 60 or equivalent holder such that the blank 61 can be heated until it becomes substantially flowable. The blank 61 is preferably deposited in the crucible as a solid block, although smaller discrete pieces could be used in the alternative. As another alternative, the blank 61 may initially be in powder or liquid form when it is deposited in the crucible 60.

Figure 4B:
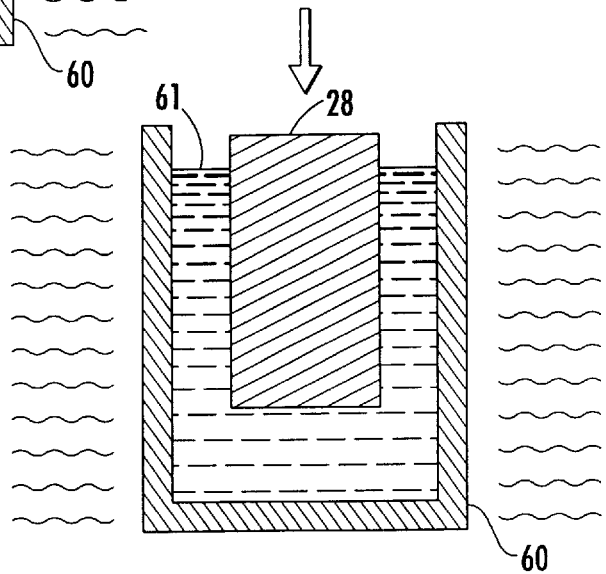

In a preferred embodiment, the blank 61 is heated until it melts, resulting in a bath of the non-emissive material. Referring to FIGS. 4A–4B, the emissive element 28 is positioned adjacent the blank 61, such as in contact with or close to the blank, and then is inserted or advanced at least partially into the blank when the blank melts or becomes substantially flowable. In one embodiment, the emissive element 28 is allowed to fall under gravity at least partially into the blank 61, although force could also be used to help advance or force the emissive element into the blank. In one embodiment, the emissive element 28 and the blank 61 continue to be heated for a predetermined time, such as up to about 1 minute, and more particularly about 15 seconds, to assist in forming the bond between the emissive element 28 and the blank 61. In particular, the additional heating after the emissive element 28 is advanced into the blank 61 allows a higher temperature to be reached, or simply to maintain a particular temperature for a longer time, in order to allow formation of an intermetallic compound, as discussed below. In addition, an environment of reduced pressure or a vacuum can be created before, during, or after the emissive element 28 is inserted into the blank 61. By doing so, dissolved gases can be removed from the heated materials in order to form stronger bonds therebetween.

Figure 4C:
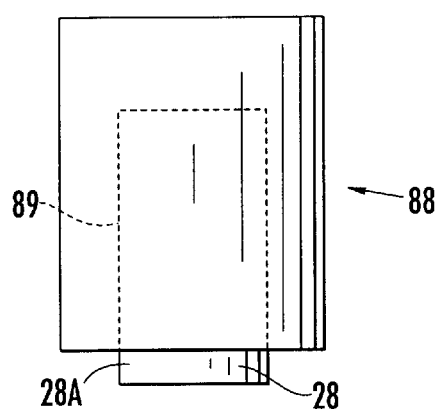

Referring to FIG. 4C, the emissive element 28 and the blank 61 are then allowed to cool to form an assembly 88, whereby the blank solidifies around the emissive element and a strong bond is formed therebetween. After the emissive element 28 and blank 61 have been cooled to form the assembly 88, the assembly is removed from the crucible 60 so that it can be inserted into the holder 16 as described below. According to this embodiment, the blank 61 serves as the separator 32 and is referred to as such hereinafter for convenience. It should also be noted that a small portion 28A of the emissive element 28 may extend from the separator 32 after the emissive element has been inserted therein where the emissive element was gripped or held by a positioning device (not shown) or other tool during the assembly forming process. The small extending portion 28A can be easily removed, however, using conventional techniques.

Advantageously, an intermetallic compound 89 is formed between the emissive element 28 and the separator 32 during the assembly forming process described above. The intermetallic compound 89 is a separate material with unique properties compared to the emissive element 28 and the separator 32. The intermetallic compound 89 provides a superior bond between the emissive element 28 and separator 32 compared to press fitting or diffusion bonding, as the thickness of the intermetallic compound is usually about 0.0001" to about 0.001", such as about 0.0004". By inserting the emissive element 28 into the blank 61 when the blank is melted, the intermetallic compound 89 can be formed substantially faster than by other methods, such as described in co-pending application Ser. No. 09/871,071 described above. In particular, the intermetallic compound 89 is formed according to the present invention in about 1 minute or less, while the intermetallic compound formed by the process described in the '071 application is formed in about 1 hour. Thus, the methods of the present invention allow for greatly increased rates of electrode fabrication as well as improved bonds between the emissive element and the separator 32.

Figure 5:
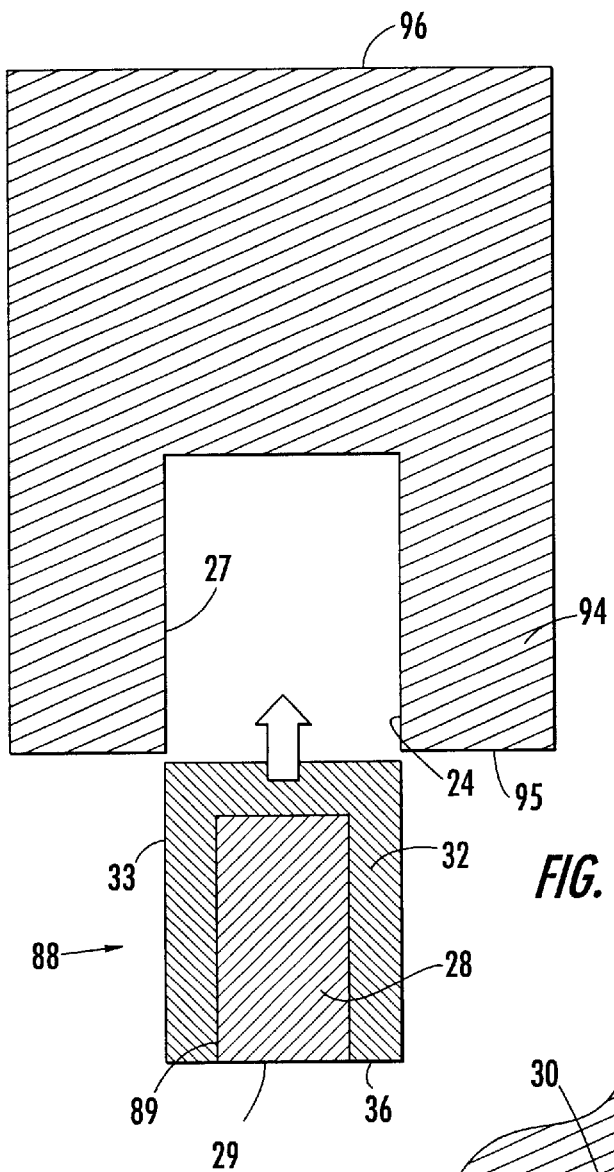

Turning to FIG. 5, a cylindrical blank 94 of copper or copper alloy is provided having a front face 95 and an opposite rear face 96. A generally cylindrical bore is then formed, such as by drilling, in the front face 95 along the longitudinal axis so as to form the cavity 24 as described above. The emissive element 28 and separator 32 assembly, which in one embodiment includes the formed intermetallic compound 89, is then inserted into the cavity 24, such as by press-fitting, such that the peripheral wall 33 of the separator engages the inner wall 27 of the cavity and is secured thereto in a surface-to-surface, frictional relationship. The assembly can also be inserted into the cavity 24 by way of brazing, welding, and equivalent conventional methods. For example, the assembly could be welded into the cavity 24 by way of friction, resistance, electro-magnetic discharge, or explosive welding techniques.

Figure 6:
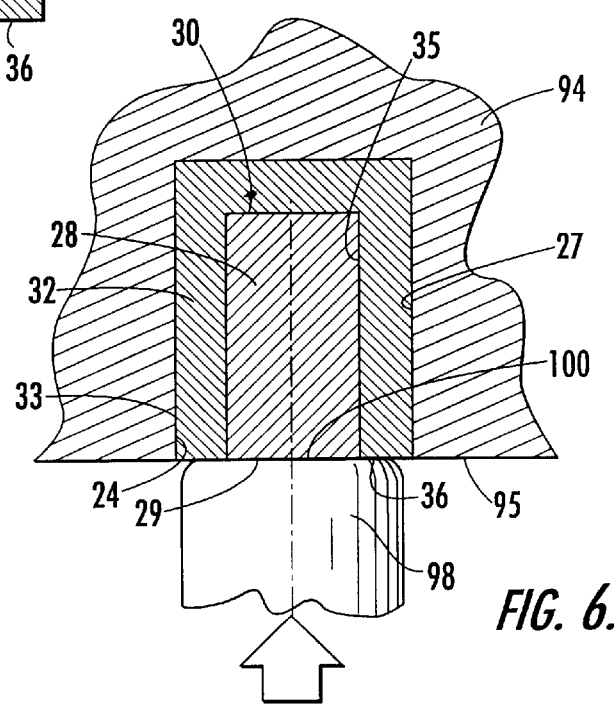

According to one embodiment shown in FIG. 6, a tool 98 having a generally planar circular working surface 100 is placed with the working surface in contact with the end faces 29 and 36 of the emissive element 28 and separator 32, respectively. The outer diameter of the working surface 100 is slightly smaller than the diameter of the cavity 24 in the cylindrical blank 94. The tool 98 is held with the working surface 100 generally coaxial with the longitudinal axis of the torch 10, and force is applied to the tool so as to impart axial compressive forces to the emissive element 28 and the separator 32 along the longitudinal axis. For example, the tool 98 may be positioned in contact with the emissive element 28 and separator 32 and then struck by a suitable device, such as the ram of a machine. Regardless of the specific technique used, sufficient force is imparted so as to cause the emissive element 28 and the separator 32 to be deformed radially outwardly such that the emissive element is tightly gripped and retained by the separator, and the separator is tightly gripped and retained by the cavity 24. Care must be taken, however, so as not to destroy or damage the internetallic compound 89 between the emissive element 28 and the separator 32.

Figure 7A:
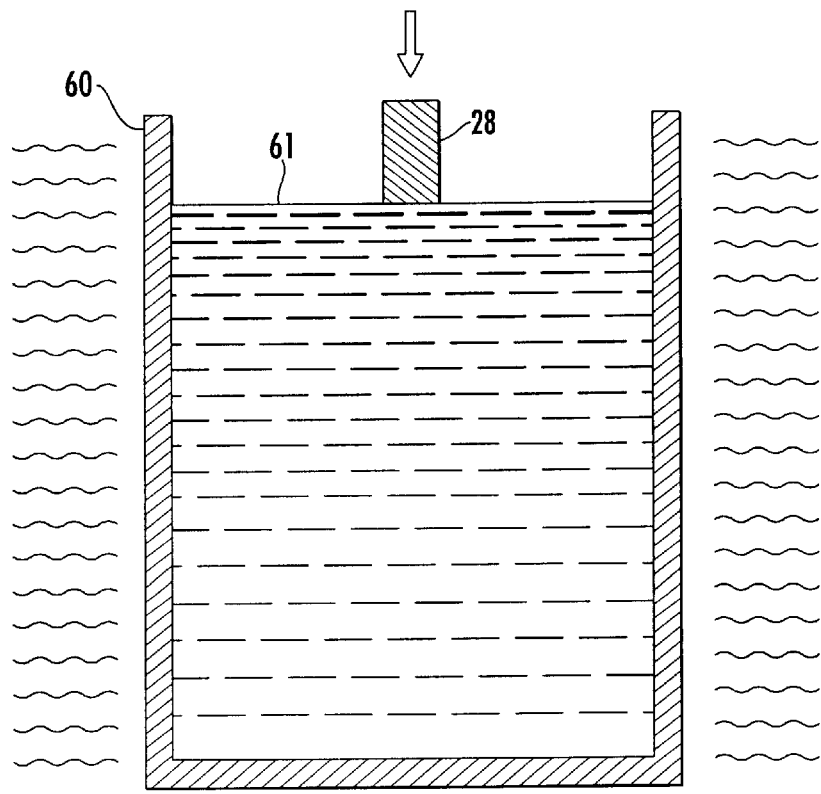
Figure 7B:
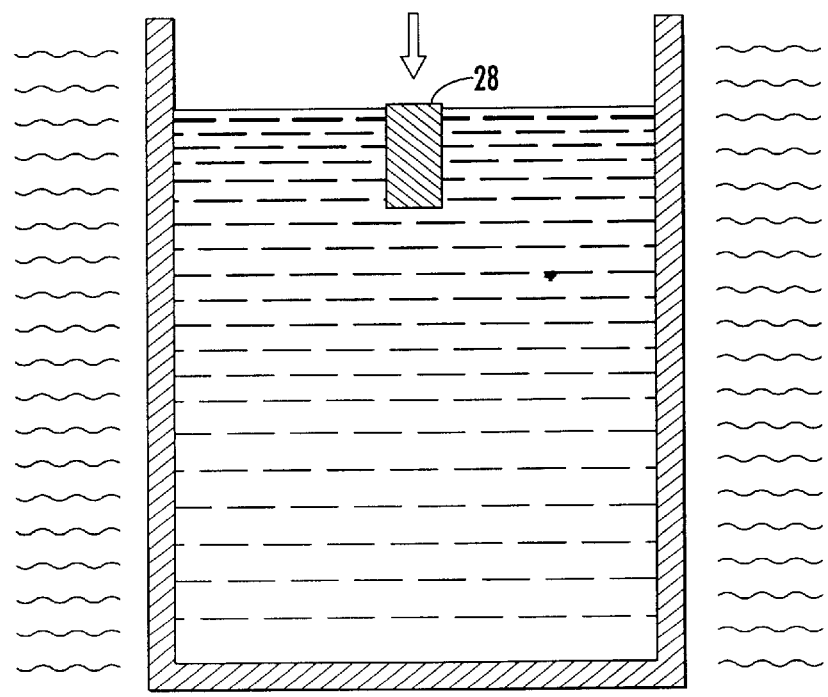

FIGS. 7A–8B show an alternative embodiment according to the present invention. Referring first to FIG. 7A, the blank 61 of relatively non-emissive material is heated in the crucible 60 or similar device until it becomes substantially flowable, such as when the blank 61 melts, as described above. The emissive element 28 is inserted in a similar fashion as described above. Advantageously, however, the blank 61 is sized much larger such that the blank 61 is as large in diameter as the copper blank 94 described above. Thus, after the blank 61 is heated as shown in FIG. 7B and the emissive element 28 falls or is advanced into the blank 61, the emissive element 28 and blank 61 are cooled and removed from the crucible 60 as described above to form an assembly 76 as shown in FIG. 8A. In particular, the assembly 76 has a front end 91 and a body 93.

Figure 8A:
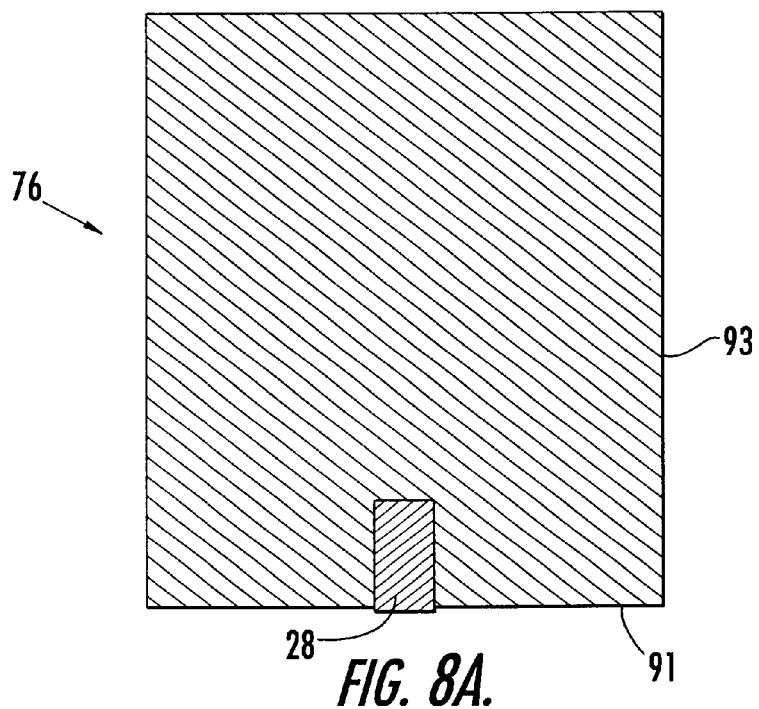
Figure 8B:
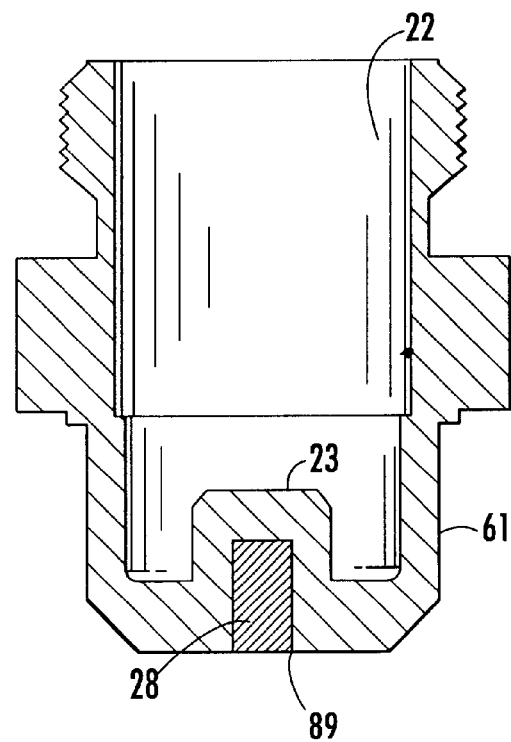

Referring to FIG. 8B, the blank 61 is then shaped into a predetermined shape such that the non-emissive blank 61 defines a substantial portion of the electrode 14. In fact, the non-emissive blank 61 is shaped in a manner similar to how the copper blank 94 is shaped in the other embodiments of the present invention described above such that the front end 91 and body 93 of the assembly 76 defines the lower front end of the electrode 14. Thus, the copper holder 16 is essentially replaced by the non-emissive blank 61. While the materials of the blank 61 (e.g., silver) typically cost more than those used in the metallic holder 16 (e.g. copper), the thermal conductivity and other properties of the material(s) forming the blank 61 result in better performance of the electrode such that the costs of fabricating the electrode are at least partially offset. In addition, the interface that exists between the outer peripheral wall 33 and inner side surface 27 of the holder cavity 24 as described above for the embodiments that include the holder is eliminated by the embodiment shown in FIGS. 7A–8B, which further improves the heat transfer through the electrode and to the cooling water circulating in the rear cavity 22.

FIG. 9 shows yet another alternative embodiment wherein the formation of the electrode is accomplished by first providing the metallic blank 94 defining the cavity 24 therein and using the metallic blank 94 itself as a crucible for melting the blank 61 of relatively non-emissive material until is becomes sufficiently flowable as described above and shown in FIGS. 4–6. More specifically, the metallic blank 94 has a melting temperature that is greater than that of the blank 61, such that applying sufficient heat to the blanks 94 and 61 causes the blank 61 to melt or sufficiently flowable such that the emissive element 28 positioned adjacent the blank 61 drops or advances at least partially into the blank 61 as described above and shown in FIG. 9 in dashed lines. In one embodiment, the components continue to be heated for a predetermined time, such as up to about 1 minute and more preferably about 15 seconds, although this step is not required. Advantageously, the intermetallic compound 89 is formed between the emissive element and the relatively non-emissive material of the blank 61. In addition, a eutectic alloy 102 is also formed between the blank 61 and the metallic blank 94. Once the emissive element 28 is positioned accordingly in the blank 61, the emissive element and blanks 61 and 94 are cooled such that the components are bonded firmly together, wherein the intermetallic compound 89 is positioned between the emissive element 28 and the separator 32 formed from.the blank 61, and the eutectic alloy 102 is positioned between the separator 32 and the blank 94. The blank 94 is then shaped to form the holder 16 described above and shown in FIG. 9 in dashed lines. The embodiment represented by FIG. 9 is advantageous because a separate crucible is not required to heat the relatively non-emissive material forming the blank 61 until it becomes sufficiently flowable. As such, the bonding between the emissive element 28, separator 32, and holder 16 is achieved in very few steps, and preferably a single step.

FIG. 10 shows another process that also enhances the strength of the electrode and thus the operational life span of the electrode. In particular, FIG. 10 illustrates a crimping process at the front end of the electrode using pressing tools 97. The pressing tools 97 bear radially inwardly against the outer surface of the metallic blank 94 to press the blank, separator 32, and emissive element 28 together, which further bonds the materials together. In one embodiment, the radius of the metallic blank 94 is reduced an amount d, which in one embodiment is between about 0.050–0.100 inches. The outer shape can also be changed during crimping, such as from a cylindrical blank to a hexagonal shape as illustrated. The crimping process could also be performed after the blank 94 has been machined into a near-final form.

The crimping process provides at least two benefits. One benefit is that the pressing action causes any voids present between the emissive element 28, separator 32, and metallic blank 94 to be substantially eliminated. This is important because voids act as stress concentrators, which may lead to early failure of the electrode. If crimping were not used (and thus the void not closed), the electrode life would be poor, such as between about 0–20 minutes. If crimping is performed, however, the electrode life is orders of magnitude higher, such as between 300–400 minutes or more. However, care must be taken during the pressing action, as over-crimping the electrode may destroy or damage the bonds formed between the components thereof and/or the intermetallic compound 89 formed between the emissive element 28 and the blank 61. In addition, while the crimping process is described as including a separator 32 and metallic blank 94, the crimping process could also be performed in the embodiment described above and shown in FIGS. 7A–8B where the non-emissive blank 61 is sized to replace the metallic blank 94.

Referring back to FIGS. 3 and 8B, cross-sectional views of completed electrodes according to the present invention are shown. As shown in FIG. 3, to complete the fabrication of the holder 16, the rear face 96 of the cylindrical blank 94 is machined to form an open cup-shaped configuration defining the cavity 22 therein. Advantageously, the cavity 22 includes an internal annular recess 82 which defines the cylindrical post 23 and coaxially surrounds portions of the separator 32 and emissive element 28. In addition, the internal annular recess 82 includes an internal surface 83. In other words, the internal annular recess 82 is formed, such as by trepanning or other machining operation, to define the cylindrical post 23. The external periphery of the cylindrical blank 94 is also shaped as desired, including formation of external threads 102 at the rear end 19 of the holder 16. Finally, the front face 95 of the blank 94 and the end faces 29 and 36 of the emissive element 28 and separator 32, respectively, are machined so that they are substantially flat and flush with one another. A similar process can be performed for the electrode shown in FIG. 8B, although for the embodiment shown in FIG. 8B the blank 61 is machined to form the cavity 22 and similar elements described above.

FIG. 11 depicts an end elevational view of the holder 16. It can be seen that the end face 36 of the separator 32 separates the end face 29 of the emissive element 28 from the front face 20 of the holder 16. The end face 36 is annular having an inner perimeter 104 and an outer perimeter 106. The separator 32 serves to discourage the arc from detaching from the emissive element and becoming attached to the holder 16.

Thus, the present invention provides an electrode 14 for use in a plasma arc torch and a method of making an electrode wherein an intermetallic compound 89 is formed between the emissive element 28 and the separator 32 or non-emissive material or blank 61 by melting the blank and inserting the emissive element therein. When the non-emissive material is cooled and solidifies around the emissive element, the resulting intermetallic compound 89 forms a strong bond therebetween. Advantageously, the electrode of the present invention can be fabricated quickly and easily. More specifically, the intermetallic compound 89 of the present invention can be formed up to 50 times faster or more compared to conventional techniques. Thus, the cost and time to fabricate an electrode according to the present invention is reduced, while still providing a strong and long-lasting electrode.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating an electrode adapted for supporting an arc in a plasma torch, the method comprising:

providing a metallic holder defining a cavity in a front end thereof;

heating a relatively non-emissive member until the non-emissive member becomes substantially flowable;

inserting an emissive element at least partially into the substantially flowable non-emissive member such that the emissive element and the non-emissive member are bonded together to define an assembly; and positioning the assembly into the metallic holder.

2. A method according to claim 1, further comprising heating the assembly for a predetermined time after the emissive element is at least partially inserted in the non-emissive member.

3. A method according to claim 1, further comprising cooling the assembly after the inserting step.

4. A method according to claim 3, wherein the cooling step occurs before the positioning step.

5. A method according to claim 1, wherein the positioning step includes pressing the assembly in the cavity defined by the metallic holder.

6. A method according to claim 1, wherein the inserting step includes inserting an emissive element formed substantially from at least one of the materials selected from the group consisting of hafnium, zirconium, tungsten, and alloys thereof.

7. A method according to claim 1, wherein the inserting step includes inserting the emissive element in a relatively non-emissive member formed substantially from at least one of the materials from the group consisting of silver, gold, platinum, rhodium, iridium, palladium, nickel, monel, and alloys thereof.

8. A method according to claim 1, wherein the heating step includes heating the non-emissive member in a crucible until the non-emissive member substantially melts.

9. A method according to claim 1, further comprising creating an environment having a relatively lower pressure about the emissive element and the non-emissive member.

10. A method according to claim 9, wherein the environment creating step occurs before the inserting step.

11. A method according to claim 1, wherein the inserting step includes forcibly inserting the emissive element into the non-emissive member when the non-emissive member becomes substantially flowable.

12. A method according to claim 1, further comprising crimping the assembly and metallic holder by pressing the metallic holder radially inward.

13. A method according to claim 1, further comprising shaping the metallic holder and assembly to a predetermined shape after the inserting step.

14. A method of fabricating an electrode adapted for supporting an arc in a plasma torch, the method comprising:

providing a metallic holder defining a cavity in a front end thereof;

positioning an emissive element in contact with a relatively non-emissive member;

heating at least the non-emissive member until the non-emissive member becomes substantially flowable and the emissive element advances at least partially into the non-emissive member to define an assembly; and positioning the assembly into the metallic holder.

15. A method according to claim 14, wherein the heating step includes heating at least the non-emissive member such that the emissive element advances into the non-emissive member at least partially due to gravity.

16. A method according to claim 14, further comprising heating the assembly for a predetermined time after the emissive element advances into the non-emissive member.

17. A method according to claim 14, further comprising cooling the assembly after the heating step.

18. A method according to claim 14, wherein the cooling step occurs before the positioning step.

19. A method according to claim 14, wherein the heating step includes heating at least the non-emissive member such that the emissive element advances into the non-emissive member substantially due to gravity.

20. A method according to claim 14, wherein the positioning step includes pressing the assembly in the cavity defined by the metallic holder.

21. A method according to claim 14, wherein the positioning step includes positioning an emissive element formed substantially from at least one of the materials selected from the group consisting of hafnium, zirconium, tungsten, and alloys thereof.

22. A method according to claim 14, wherein the positioning step includes positioning an emissive element adjacent a relatively non-emissive member formed substantially from at least one of the materials from the group consisting of silver, gold, platinum, rhodium, iridium, palladium, nickel, monel, and alloys thereof.

23. A method according to claim 14, wherein the heating step includes heating the non-emissive member in a crucible until the non-emissive member substantially melts.

24. A method according to claim 14, further comprising creating an environment having a relatively lower pressure about the emissive element and the non-emissive member.

25. A method according to claim 24, wherein the environment creating step occurs before the inserting step.

26. A method according to claim 14, wherein the assembly positioning step includes positioning the assembly into the metallic holder by way of one method selected from the group consisting of press fitting, brazing, welding, and equivalents thereof.

27. A method according to claim 26, wherein the welding method is selected from the group consisting of friction, resistance, electromagnetic discharge, and explosive welding.

28. A method of fabricating an electrode adapted for supporting an arc in a plasma torch, the method comprising:

positioning an emissive element adjacent a relatively non-emissive member;

heating at least the non-emissive member until the non-emissive member becomes substantially flowable and the emissive element advances at least partially into the non-emissive member to define an assembly having a front end and a body;

allowing the assembly to cool; and shaping the assembly such that non-emissive member defines a substantial portion of the electrode.

29. A method according to claim 28, wherein the shaping step includes shaping the assembly such that the front end and the body of the assembly define a front end of the electrode.

30. A method according to claim 28, wherein the front end and body of the assembly are exposed to a cutting gas at the front end of the torch during a cutting operation.

31. A method of fabricating an electrode adapted for supporting an arc in a plasma torch, the method comprising:

providing a metallic holder defining a cavity in a front end thereof;

providing a bath of substantially flowable material that is relatively non-emissive;

advancing an emissive element at least partially into the bath;

allowing the bath to cool with the emissive element at least partially therein such that the non-emissive material solidifies around the emissive element to form an assembly; and positioning the assembly into the metallic holder.

32. A method according to claim 31, further comprising shaping the metallic holder and assembly to a predetermined shape after the assembly positioning step.

33. A method according to claim 31, wherein the allowing step includes cooling the bath such that an intermetallic compound is positioned between the emissive element and the non-emissive material.

34. A method according to claim 31, further comprising maintaining the emissive element at least partially in the bath for a predetermined time before the allowing step.

35. A method according to claim 34, wherein the predetermined time is no more than about 1 minute.

36. A method according to claim 31, wherein the positioning step includes pressing the assembly in the cavity defined by the metallic holder.

37. A method according to claim 31, wherein the advancing step includes advancing an emissive element formed substantially from at least one of the materials selected from the group consisting of hafnium, zirconium, tungsten, and alloys thereof.

38. A method according to claim 31, wherein the bath providing step includes providing a bath formed substantially from at least one of the materials from the group consisting of silver, gold, platinum, rhodium, iridium, palladium, nickel, monel, and alloys thereof.

39. A method according to claim 31, wherein the bath providing step includes heating the non-emissive material in a crucible until the non-emissive material becomes substantially flowable.

40. A method according to claim 31, further comprising creating an environment having a relatively lower pressure about the emissive element and bath before the advancing step.

41. A method of fabricating an assembly for use with a metallic holder of an electrode adapted for supporting an arc in a plasma torch, the method comprising:

providing a bath of substantially flowable material that is relatively non-emissive;

advancing an emissive element at least partially into the bath;

allowing the bath to cool with the emissive element at least partially therein such that the non-emissive material solidifies around the emissive element to form the assembly; and shaping the assembly for use with the metallic holder of the plasma torch.

42. A method according to claim 41, wherein the allowing step includes cooling the bath such that an intermetallic compound is positioned between the emissive element and the non-emissive material.

43. A method according to claim 41, further comprising maintaining the emissive element at least partially in the bath for a predetermined time before the allowing step.

44. A method according to claim 43, wherein the predetermined time is no more than about 1 minute.

45. A method according to claim 41, wherein the advancing step includes advancing an emissive element formed substantially from at least one of the materials selected from the group consisting of hafnium, zirconium, tungsten, and alloys thereof.

46. A method according to claim 41, wherein the bath providing step includes providing a bath formed substantially from at least one of the materials from the group consisting of silver, gold, platinum, rhodium, iridium, palladium, nickel, monel, and alloys thereof.

47. A method of fabricating an electrode adapted for supporting an arc in a plasma torch, the method comprising:

providing a metallic holder defining a cavity in a front end thereof;

positioning a relatively non-emissive member into the cavity of the metallic holder;

heating the metallic holder and non-emissive member until the non-emissive member becomes substantially flowable; and inserting an emissive element at least partially into the substantially flowable non-emissive member such that the emissive element and the non-emissive member are bonded together.

48. A method according to claim 47, further comprising heating the emissive element, non-emissive member, and metallic holder for a predetermined time after the emissive element is at least partially inserted into the non-emissive member.

49. A method according to claim 47, further comprising cooling the emissive element, non-emissive member, and metallic holder after the inserting step.

50. A method according to claim 49, wherein the cooling step includes cooling the emissive element, non-emissive member, and metallic holder whereby an intermetallic compound is positioned between the emissive element and the non-emissive member.

51. A method according to claim 49, wherein the cooling step includes cooling the emissive element, non-emissive member, and metallic holder whereby an intermetallic compound is positioned between the emissive element and the non-emissive member, and a eutectic alloy is positioned between the non-emissive member and the metallic holder.

52. A method according to claim 47, further comprising shaping the metallic holder into a predetermined shape.

53. A method according to claim 52, wherein the shaping step includes shaping the metallic holder such that the holder, emissive element, and non-emissive member define a planar front end of the electrode.

54. A method according to claim 52, wherein the shaping step includes shaping the metallic holder to define a rear cavity such that a portion of the non-emissive member is exposed to the rear cavity.

55. A method according to claim 47, further comprising creating an environment having a relatively lower pressure about the emissive element, non-emissive member, and metallic holder.

56. A method according to claim 55, wherein the environment creating step occurs before the inserting step.

57. A method according to claim 47, wherein the heating step and the inserting step occur substantially simultaneously.

58. A method according to claim 47, wherein the inserting step includes forcibly inserting the emissive element into the non-emissive member when the non-emissive member becomes substantially flowable.

59. A method according to claim 47, wherein the inserting step includes inserting the emissive element substantially by way of gravity.

60. A method according to claim 47, wherein the providing step includes providing a metallic holder formed substantially from at least one of the materials from the group consisting of copper, nickel, monel, and alloys thereof.

61. A method according to claim 47, wherein the positioning step includes positioning a relatively non-emissive member formed substantially from at least one of the materials from the group consisting of silver, gold, platinum, rhodium, iridium, palladium, nickel, monel, and alloys thereof.

* * * * *